UNITED STATES PATENT OFFICE.

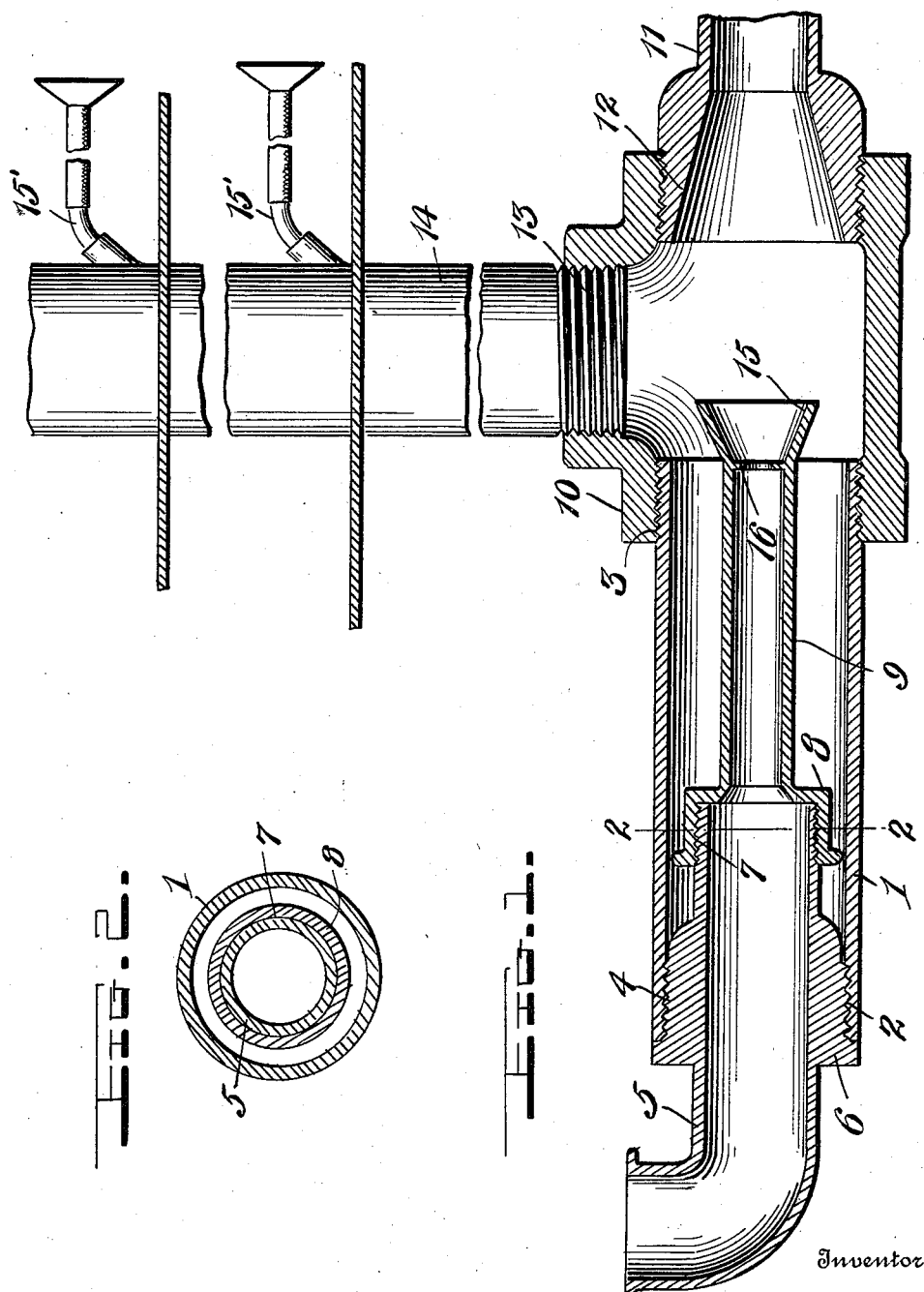

JAMES J. GORMAN, OF DURANGO, COLORADO.

HYDROVACUUM-CREATOR.

1,008,712.

Specification of Letters Patent. Patented Nov. 14, 1911.

Application filed April 24, 1911. Serial No. 623,022.

*To all whom it may concern:*

Be it known that I, JAMES J. GORMAN, a citizen of the United States, residing at Durango, in the county of La Plata and State of Colorado, have invented certain new and useful Improvements in Hydrovacuum-Creators, of which the following is a specification, reference being had to the accompanying drawings.

My invention relates to new and useful improvements in vacuum cleaners and more particularly to a hydro-vacuum cleaner, and my object is to provide a device of this character in which a vacuum is effectively maintained through the medium of a flow of water in a pipe section, which section has communication with the air.

A still further object of my invention resides in improving this type of cleaner so as to simplify the construction, increase the strength and durability, lessen the cost and effectively carry out the object for which it is designed.

With these and other objects in view, my invention consists in the novel features of construction, combination and arrangement of parts as will be hereinafter referred to and more particularly pointed out in the specification and claim.

In the accompanying drawing forming a part of this application, Figure 1 is a longitudinal section through the device, and, Fig. 2 is a transverse section therethrough as seen on line 2—2, Fig. 1.

In carrying out my invention, I shall refer to the drawing in which similar reference characters designate corresponding parts throughout the several views and in which—

1 indicates a pipe section or other tubular member having one end thereof internally threaded, as shown at 2, and the opposite end externally threaded, as shown at 3, and engaged with the internally threaded portion 4 of an additional tubular member 5, this latter member being curved at its outer end and adapted to be connected to any source of water supply (not shown). The member 5 is also provided with the annular shoulder 6 which is adapted to engage the edge of one end of the member 1 when said member 5 is properly positioned, and the inner end of said member 5 has the outer periphery thereof reduced in diameter and externally threaded, as shown at 7, to receive the internally threaded head 8 of an additional tubular member 9 extending within said pipe section 1, and of a considerably smaller diameter than the same. The opposite end of the pipe section or tubular member 1 is engaged with one end of a union 10, into which extends the free end of the tubular member 9. This union 10 is threaded at the opposite end thereof into engagement with one end of an additional pipe section 11, the latter pipe section having the inner periphery thereof flared, as shown at 12, at the end engaged with said union, and said union is also provided with a threaded opening 13 in one side thereof. This threaded opening is adapted to receive the end of an additional pipe section or the like 14 which may be of any desired length to extend to the outer air.

It will be evident that a chamber will be formed within the union 10 into which, as stated before, the free end of the tubular member 9 extends, that end which extends within said chamber being flared, as shown at 15, and the inner wall of said member adjacent its flared portion is provided with a peripheral flange 16 which forms somewhat of a deflector for the flow of water passing therethrough.

In practice, it will be seen that the member 5 being secured in communication with any source of water supply, will allow the water to flow therethrough into the tubular member 9 which is of a smaller diameter than the inner diameter of the member 5, so as to give considerable force to the water. The water in passing through the tubular member 9, contacts with the peripheral flange 16, allowing the water to be sprayed through a restricted opening in the end of the member, through the chamber formed in the union 10, and thence, through the tubular member 11 to a sewer, sink or other drain. As the union 10 has an opening therein which communicates with the air, it will be seen that as the water flows therethrough with considerable force, a partial vacuum will be maintained in this chamber, the flared end 15 of the tubular member 9 also aiding considerably in this maintenance. The usual or any preferred form of flexible connection with nozzle on the free end thereof, may be supplied and have connection with the pipe member 14 so as to collect dust, dirt and the like, from whence, it is passed into the chamber of the union and passed outwardly with the force of the water to the drain, forming a perfect vacuum cleaner. My invention, however, is particularly adapted for use in apartment houses and the like or in other homes wherein the use of a cleaner of this type is desired for more than one floor, and in this connection, I prefer to provide the pipe 14 with a plurality of branch sections 15' which extend to the various floors, these branches being adapted to be connected with the usual form of flexible connection and nozzle. In this manner, a single device of this type may be provided in the basement or cellar of a home and the pipe section 14 extended upwardly through the wall thereof, while the branch sections are extended through the various floors, and valves may be provided in connection with each of the sections 15, whereby when it is desired to use the cleaner, the valves may be opened to allow the suction of air through the pipe 14 to have its effect on the particular floor on which the same is desired for use. When use for the cleaner has been completed on any one floor, the valve may be closed, thereby preventing any suction through the device at that particular point.

From the foregoing, it will be seen that I have provided a hydro-vacuum cleaner simple and durable in construction and extremely effective in operation. Furthermore, it will be seen that the same may be readily and cheaply installed in homes or apartment houses, whereby independent floor or apartment connections may be provided.

Although I have particularly stated that this device is a hydro vacuum cleaner, it will also be understood that the same may be used in connection with low pressure steam heating plants for vacuum purposes, and furthermore, it will be understood that various changes in form, proportion and the minor details of construction may be resorted to without sacrificing the principle or any of the advantages of the invention.

What I claim is:—

A vacuum producing device of the character described, comprising a pair of pipe sections, one end of each of which is threaded externally, a union coupling the ends of said sections and forming a chamber therebetween, said union being provided with an air inlet in one side thereof, the coupled end of one of said pipe sections having its bore flared inwardly and the free end of the other pipe section being internally threaded, a tubular member of smaller diameter than said pipe sections having an enlarged externally threaded portion thereon intermediate of its ends, said threaded portion being adapted for engagement with the internally threaded end of the last referred to pipe section to dispose said tubular member partly within and partly without the chamber, the inner end of said tubular member being also externally threaded, an additional tubular member of smaller diameter than the first referred to tubular member, said additional tubular member being provided with an enlarged head which is internally threaded and engaged with the externally threaded end of the first referred to tubular member, said additional tubular member being also provided with an inner peripheral flange and having its free end flared and disposed within the chamber formed by said union, and an air pipe mounted in the air opening of said union.

In testimony whereof I hereunto affix my signature in the presence of two witnesses.

JAMES J. GORMAN.

Witnesses:
RICHARD McCLOUD,
GEORGE F. FRITZ.

Copies of this patent may be obtained for five cents each, by addressing the "Commissioner of Patents, Washington, D. C."